United States Patent
Doolittle

Patent Number: 6,142,414
Date of Patent: Nov. 7, 2000

[54] ROTOR—AEROSTAT COMPOSITE AIRCRAFT

[76] Inventor: William Doolittle, 4251 Millcreek Rd., Hockessin, Del. 19707-9107

[21] Appl. No.: 09/237,110

[22] Filed: Jan. 26, 1999

[51] Int. Cl.[7] ............................... B64B 1/20; B64B 1/34
[52] U.S. Cl. ................................ 244/25; 244/2; 244/30
[58] Field of Search .............................. 244/2, 24, 25, 244/29, 30, 31

[56] References Cited

U.S. PATENT DOCUMENTS

| | | | |
|---|---|---|---|
| 1,072,663 | 9/1913 | Silverston | 244/25 |
| 1,451,503 | 4/1923 | Goetz | 244/29 |
| 3,856,236 | 12/1974 | Doolittle | 244/2 |
| 3,946,971 | 3/1976 | Chadwick . | |
| 3,976,265 | 8/1976 | Doolittle | 244/2 |
| 4,032,086 | 6/1977 | Cooke | 244/30 |
| 4,482,110 | 11/1984 | Crimmins, Jr. | 244/26 |
| 4,601,444 | 7/1986 | Lindenbaum | 244/26 |
| 5,074,489 | 12/1991 | Gamzon | 244/2 |
| 5,082,205 | 1/1992 | Caufman | 244/25 |

*Primary Examiner*—Robert P. Swiatek
*Attorney, Agent, or Firm*—Connolly Bove Lodge & Hutz LLP

[57] ABSTRACT

A composite aircraft comprising an aerostat containing a lighter than air gas, and a rotor assembly mounted to and below the aerostat, via an axle. The aerostat provides buoyancy to lift the weight of the aircraft plus a significant portion of the payload connected to the aircraft. The rotor assembly statically connects to the aerostat in all aspects except rotationally about the axle, and provides the remaining lift and propulsion to the aircraft and payload. The rotor assembly includes a hub, a plurality of blades, a plurality of winglets, and engine-powered propellers that provide rotational thrust to the rotor assembly. The plurality of blades and winglets have adjustable angles of attack to generate lift and forward propulsion to the aircraft. The blades mount radially from the axle and horizontally from an outboard end of the hub. The winglets mount above and below each blade. The engine-powered propellers mount to the outboard end of the hub. A center mast passes through the poles of the aerostat, mounts the aerostat, and supports the blades through cables. A control cab connects below the rotor assembly and controls the operation of the components of the aircraft. A plurality of sling cables connect the blades to the payload. The aircraft can lift payloads weighing up to 1,000,000 pounds, while moving at slow to moderate forward speeds.

20 Claims, 7 Drawing Sheets

ROTOR—AEROSTAT COMPOSITE AIRCRAFT

BACKGROUND OF THE INVENTION

A. Field of the Invention

The present invention relates generally to composite aircraft, and, more particularly, to a composite aircraft comprising an aerostat providing buoyancy and a rotor assembly providing lift and propulsion.

B. Description of the Related Art

Conventional composite aircraft designs, such as those disclosed in U.S. Pat. Nos. 3,856,236, 3,976,2654, 4,482,110, 4,601,444 and 5,082,205, include a rotor statically connected to an aerostat typically along an equatorial plane. Such designs suffer from high drag, complex ballonet systems, mooring difficulties, maintenance problems, instability at no-load and light-load conditions, and potentially catastrophic instability at neutral buoyance.

SUMMARY OF THE INVENTION

An object of the present invention is to provide a composite aircraft that has pendulous stability and decouples the rotational speed of the rotor assembly and the aerostat, eliminating the problems encountered with conventional composite aircraft.

Another object of the invention is to provide a composite aircraft that lifts loads up to 1,000,000 pounds, provides stable flight at neutral buoyance, hovers, and moves at slow to moderate forward speeds.

Still another object of the present invention is to provide a composite aircraft capable of being controlled more precisely than conventional composite aircraft.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a composite aircraft comprising: an aerostat containing a lighter than air gas for lifting the aircraft and a payload attached to the aircraft; a rotor assembly mounted below and to the aerostat by an axle, the rotor assembly being statically mounted to the aerostat in all aspects except rotationally about the axle, the rotor assembly including a hub, a plurality of blades, a plurality of winglets, and means for generating rotational thrust, wherein the plurality of blades and winglets have adjustable angles of attack to generate lift and forward propulsion to the aircraft, the plurality of blades are mounted radially from the axle and horizontally from an outboard end of the hub, the plurality of winglets are mounted above and below each blade, and the rotational thrust generating means is mounted outboard of the hub to a blade spar; a mast mounted collinearly to the axle and extending through and above the aerostat to allow cables to support the rotor assembly and to transfer negative lift through the cables from the blades to the aerostat; a control cab mounted to the hub and providing a control system for the plurality of blades, the plurality of winglets, and the rotational thrust generating means; and a plurality of sling cables connecting the plurality of blades to the payload, forming a load sling below the axle.

To further achieve the objects, the present invention comprises a method of assembling a composite aircraft comprising an aerostat containing a lighter than air gas for lifting the aircraft and a payload attached to the aircraft, a rotor assembly mounted below and to the aerostat by an axle, a mast mounted collinearly to the axle and extending through and above the aerostat, a control cab mounted to the rotor assembly, and a plurality of sling cables, wherein the rotor assembly is statically mounted to the aerostat in all aspects except rotationally about the axle, the rotor assembly includes a hub, a plurality of blades, a plurality of winglets, and means for generating rotational thrust, the plurality of blades are mounted radially from the axle and horizontally from an outboard end of the hub, the plurality of winglets are mounted above and below each blade, the rotational thrust generating means is mounted outboard of the hub to a blade spar, and the sling cables connect the plurality of blades to the payload, the method comprising the steps of: assembling the components of the rotor assembly; connecting the sling cables and the control cab to the rotor assembly; and connecting the aerostat and the mast to the plurality of blades.

To still further achieve the objects, the present invention comprises a method of mooring a composite aircraft comprising an aerostat containing a lighter than air gas for lifting the aircraft and a payload attached to the aircraft, a rotor assembly mounted below and to the aerostat by an axle, a mast mounted collinearly to the axle and extending through and above the aerostat, a control cab mounted to the rotor assembly, and a plurality of sling cables, wherein the rotor assembly is statically mounted to the aerostat in all aspects except rotationally about the axle, the rotor assembly includes a hub, a plurality of blades, a plurality of winglets, and means for generating rotational thrust, the plurality of blades are mounted radially from the axle and horizontally from an outboard end of the hub, the plurality of winglets are mounted above and below each blade, the rotational thrust generating means is mounted outboard of the hub to a blade spar, and the sling cables connect the plurality of blades to the payload, the method comprising the steps of: attaching the aircraft to a mooring weight; stopping rotation of the aircraft; bringing the aircraft close to the ground; bringing the control cab close to the ground to permit the crew to disembark; attaching a tether line to the aircraft; allowing the aircraft to float upward a safe distance from the ground; and allowing the plurality of blades and winglets to rotate freely to minimize aerodynamic drag.

To even still further achieve the objects, the present invention comprises a method of flying a composite aircraft comprising an aerostat containing a lighter than air gas for lifting the aircraft and a payload attached to the aircraft, a rotor assembly mounted below and to the aerostat by an axle, a mast mounted collinearly to the axle and extending through and above the aerostat, a control cab mounted to the rotor assembly, and a plurality of sling cables, wherein the rotor assembly is statically mounted to the aerostat in all aspects except rotationally about the axle, the rotor assembly includes a hub, a plurality of blades, a plurality of winglets, and means for generating rotational thrust, the plurality of blades are mounted radially from the axle and horizontally from an outboard end of the hub, the plurality of winglets are mounted above and below each blade, the rotational thrust generating means is mounted outboard of the hub to a blade spar, and the sling cables connect the plurality of blades to the payload, the method comprising the steps of: bringing the aircraft close to the ground to allow the crew to board; allowing the aircraft to rise a safe distance above the ground for rotation; generating torque with the rotational thrust generating means to accelerate the rotational speed of the rotor assembly and overcome aerodynamic drag; bringing the rotor assembly to a radial velocity of approximately 4 to 10 times the force of gravity; maintaining the radial velocity of the rotor assembly in accordance with the changes in the aerodynamic drag exerted on the aircraft; applying a negative angle of attack to the plurality of blades so that the negative lift of the plurality of blades offsets the buoyancy of the aircraft; and releasing the aircraft from the ground for free flight.

Finally, to achieve the objects the present invention comprises a method of flying a composite aircraft using pendulous stability, the composite aircraft comprising an aerostat containing a lighter than air gas for lifting the aircraft and a payload attached to the aircraft, a rotor assembly mounted below and to the aerostat by an axle, a mast mounted collinearly to the axle and extending through and above the aerostat, a control cab mounted to the rotor assembly, and a plurality of sling cables, wherein the rotor assembly is statically mounted to the aerostat in all aspects except rotationally about the axle, the rotor assembly includes a hub, a plurality of blades, a plurality of winglets, and means for generating rotational thrust, the plurality of blades are mounted radially from the axle and horizontally from an outboard end of the hub, the plurality of winglets are mounted above and below each blade, the rotational thrust generating means is mounted to the outboard end of the hub, and the sling cables connect the plurality of blades to the payload, the method comprising the steps of:

rolling the composite aircraft to a roll angle where the moment of the differential lift created by the plurality of blades balances with the moment of the pendulum created by the rotor assembly and payload swinging below the aerostat; and balancing the slippage created by the roll angle and maintaining the direction of travel of the composite aircraft by generating thrust with the plurality of winglets, wherein pendulous stability enables maximum lift during forward flight, and increases the maximum payload capable of being carried by the composite aircraft.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

The invention is broadly drawn to a composite aircraft comprising an aerostat 10 containing a lighter than air gas and providing buoyancy, and a rotor assembly 12 mounted below aerostat 10 and providing lift and propulsion. The aircraft operates within a range from zero load to a maximum load of 1,000,000 pounds, depending upon the scale of the aircraft. The aircraft also flies at neutral buoyance, and hovers or moves at slow to moderate forward speeds. More than 20 major areas of use have been identified for this aircraft, including factory house delivery, logging, site seeing, and land-and-sea mine detection.

Figure 2:
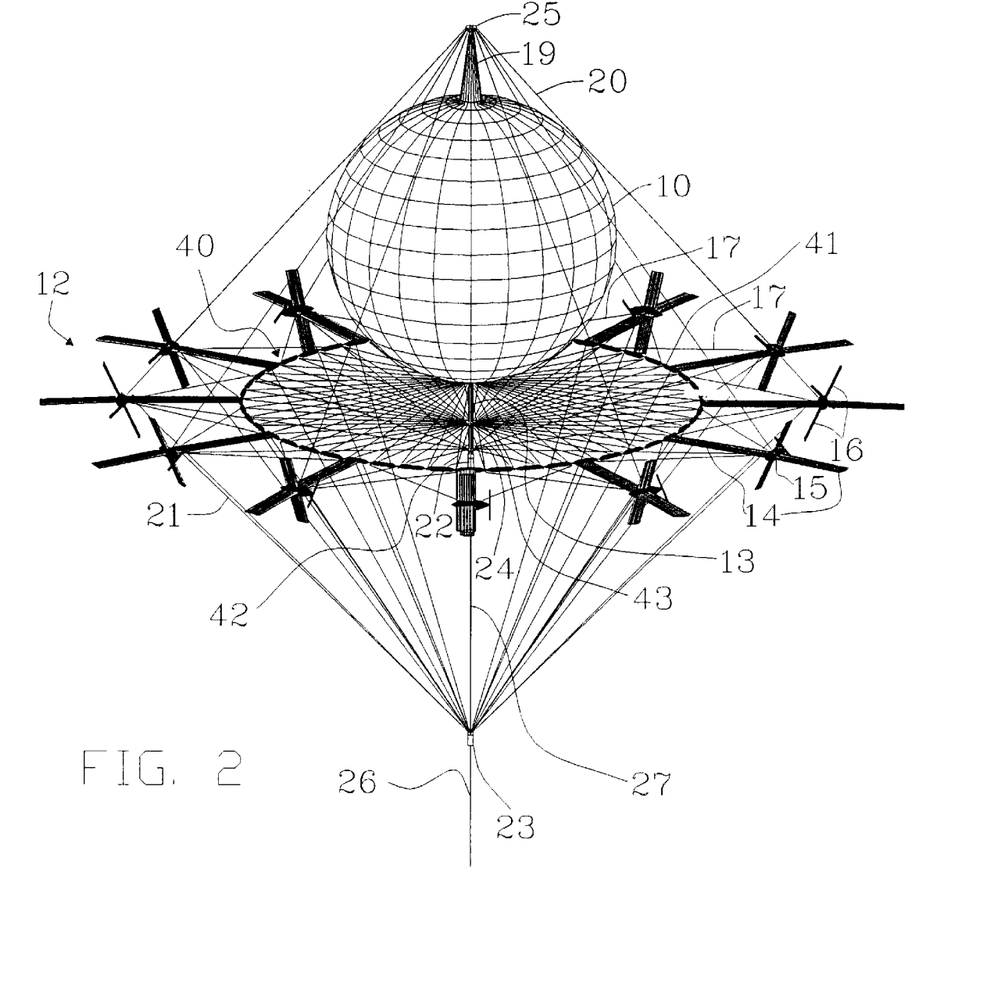
FIG. 2 is a perspective view of a second embodiment of the composite aircraft having a wheel-type hub, adjustable angle winglets, and rotational thrust generating means mounted inboard.
Figure 3:
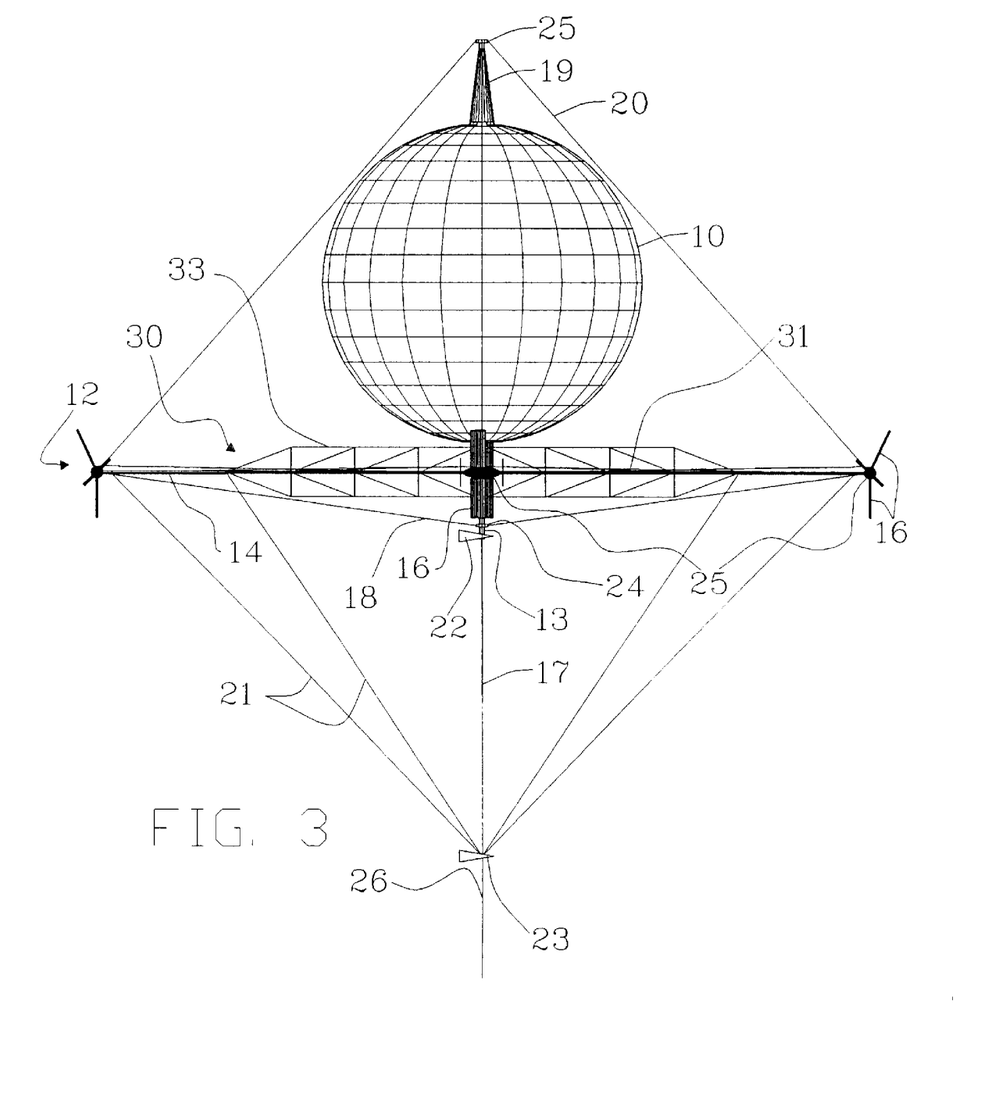
FIG. 3 is a side view of the first embodiment of the composite aircraft shown in FIG. 1, wherein the dihedral winglets are approximately perpendicular to the direction of travel.
Figure 4:
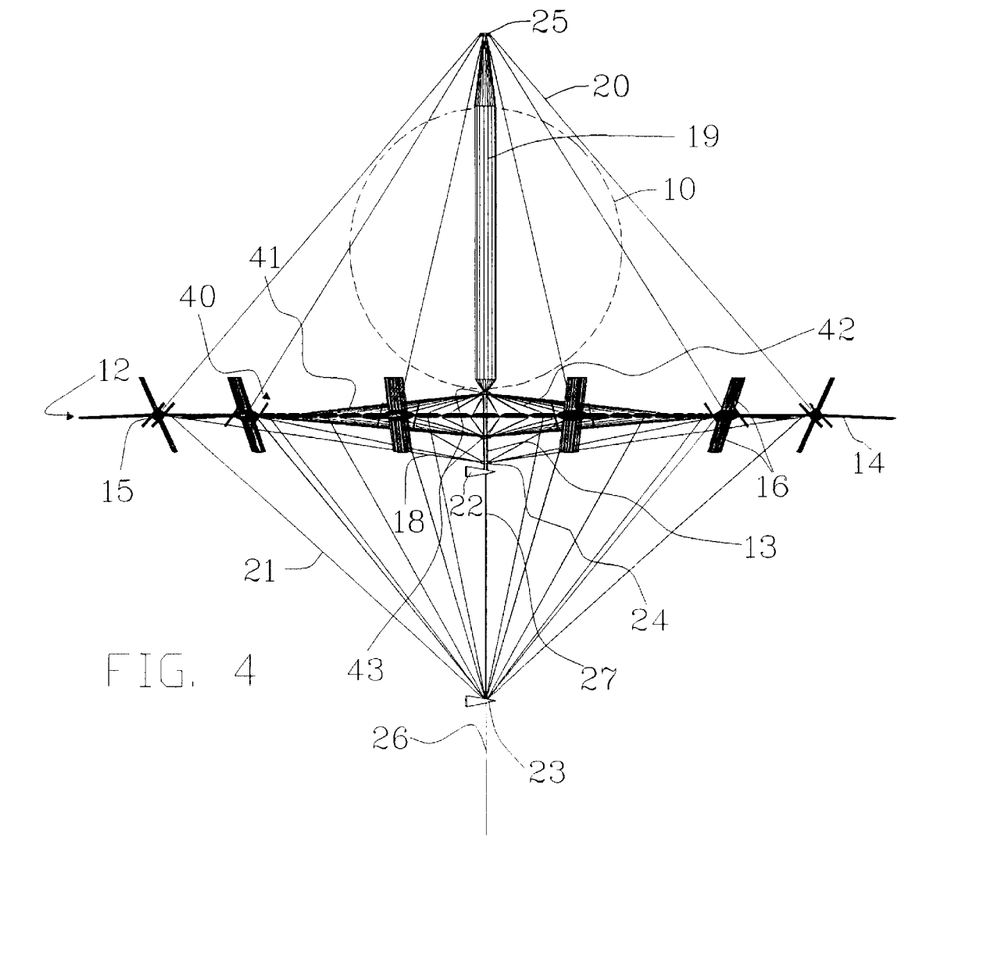
FIG. 4 is a side view of the second embodiment of the composite aircraft shown in FIG. 2, wherein the winglets and rotational thrust generating means are angled at approximately 15 degrees from the plane perpendicular to the direction travel.

Rotor assembly 12 mounts around an axle 13 and comprises a hub (a strut-type hub 30 in the first embodiment or a wheel-type hub 40 in the second embodiment), blades 14, a rotational thrust generating system 15, winglets 16, radial guy cables 17 and lower guy cables 18. Aerostat 10 mounts to rotor assembly 12 by means of a mast 19 and upper guy cables 20. The payload (load to be moved by the aircraft) attaches to rotor assembly 12 by sling cables 21 and a load cable 26. An upper control cab 22 mounts to axle 13, while a lower control cab 23 mounts to sling cables 21. A load member 27, as shown in FIGS. 2–4, may be provided that connects the bottom of axle 13 to the lower ends of the converging sling cables 21 and/or lower control cab 23. Rotor assembly 12 supplies lift, propulsion, and aerodynamic stability to the aircraft, while supplying lift to the payload via sling cables 21.

As known in the art of composite aircraft design, aerostat 10 comprises a large balloon chamber filled with a lighter-than-air gas, a ballonet (not shown) surrounding mast 19 at the bottom of the interior of balloon chamber, and an emergency venting system (not shown) for maintaining proper internal pressure. Aerostat 10 mounts to mast 19 at its north and south poles, and provides buoyancy for the aircraft.

Mast 19 extends from below the south pole of aerostat 10, where it connects to and is collinear with axle 13, and enters through the south pole of aerostat 10. Mast 19 extends through the interior of balloon chamber, exits through the north pole of aerostat 10, and extends above aerostat 10 at a distance enabling upper guy cables 20 to operate clear of aerostat 10. Mast 19 serves as a connection point for aerostat 10 and axle 13, as a compression member for aerostat 10 to upper guy cables 20, and as a tension member for aerostat 10 to axle 13. Mast 19 also provides a mounting point for axle 13 and upper guy cables 20.

Axle 13 extends substantially vertically from below aerostat 10, where it mounts to mast 19, and terminates below rotor assembly 12 at upper control cab 22. Axle 13 connects aerostat 10 to rotor assembly 12, via mast 19, serves as a rotation point for rotor assembly 12, and connects upper control cab 22 to rotor assembly 12.

Figure 1:
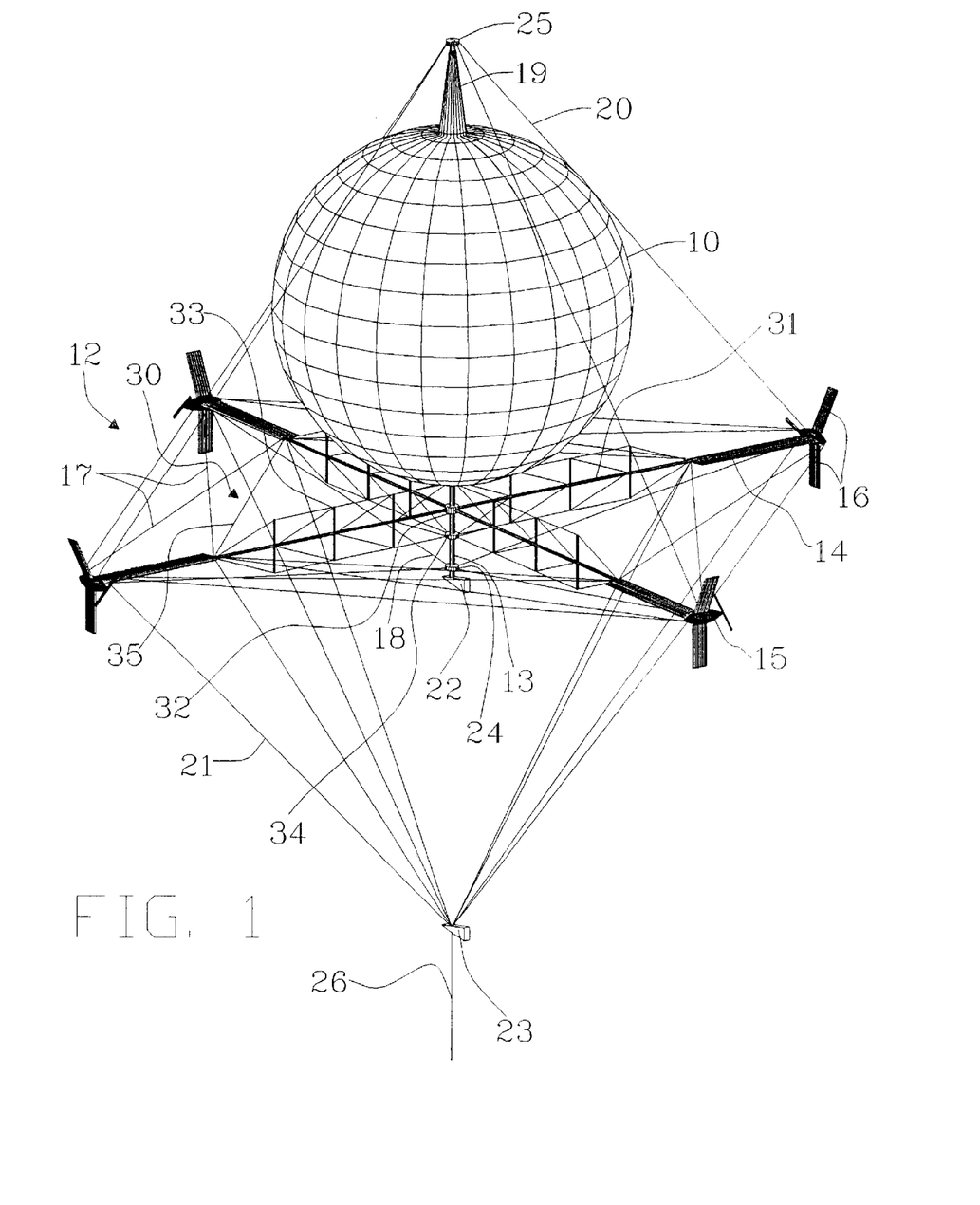
FIG. 1 is a perspective view of a first embodiment of the composite aircraft of the present invention having a strut-type hub and dihedral winglets.
Figure 5:
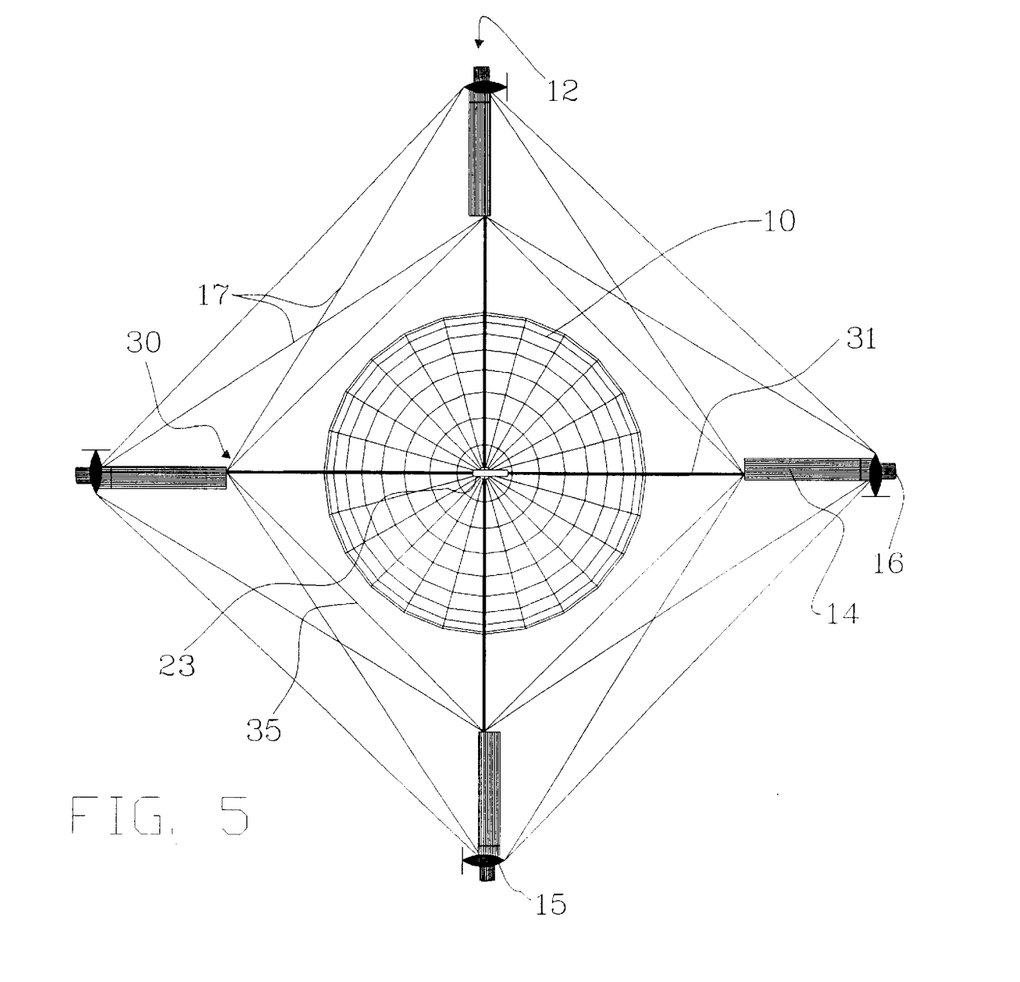
FIG. 5 is a bottom view of the first embodiment of the composite aircraft shown in FIG. 1.
Figure 6:
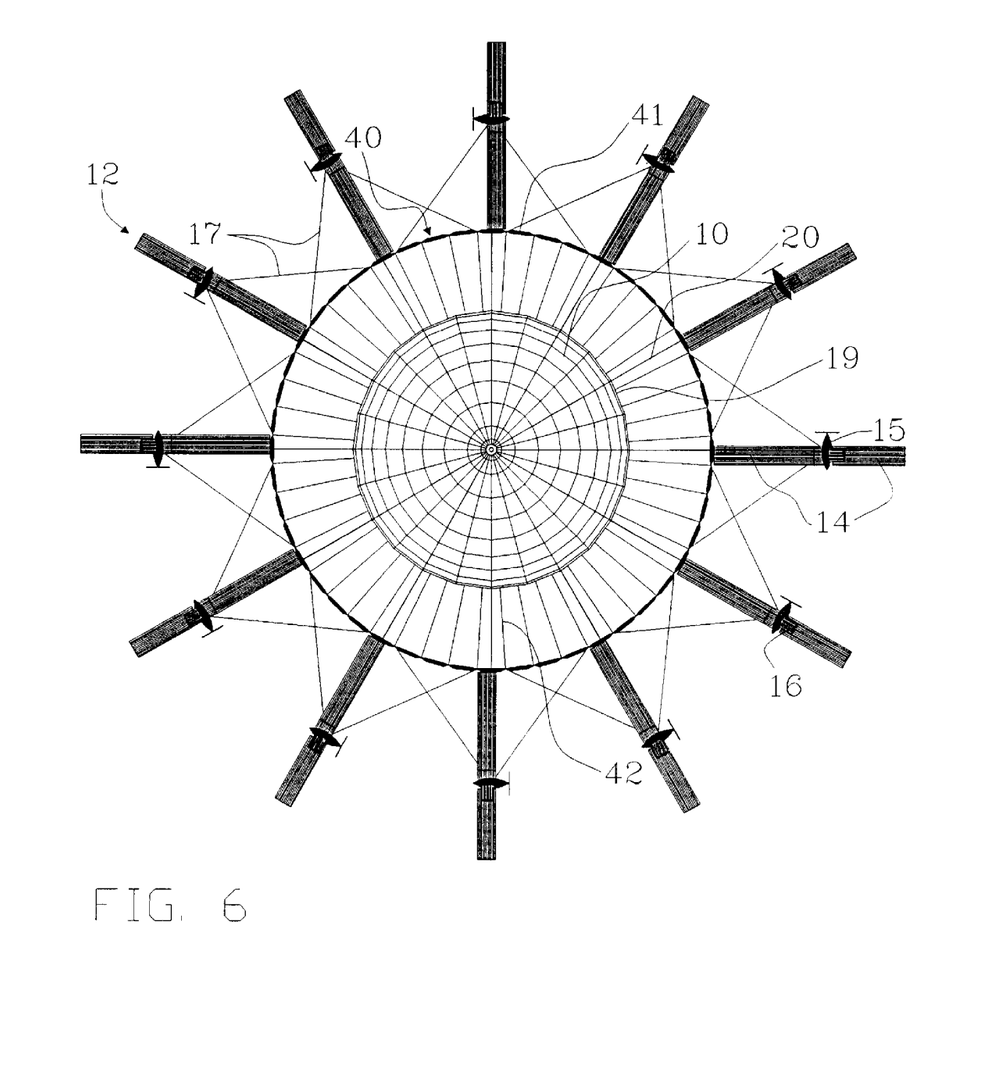
FIG. 6 is a top view of the second embodiment of the composite aircraft shown in FIG. 2.

Either strut-type hub 30 (as shown in FIGS. 1, 3 and 5) or wheel-type hub 40 (as shown in FIGS. 2, 4 and 6) mounts concentrically to axle 13 and extends radially in a substantially horizontal direction to an inner mounting point of blades 14. Strut-type hub 30 comprises a plurality of struts 31 mounted to axle 13 through a strut bearing 32 that permits hub 13 to rotate independently of axle 13 and aerostat 10. Struts 31 are stabilized against vertical deflection by a shroud and spreader system 33. Shroud and spreader system 33 terminates at bearings 34 mounted around axle 13, above and below strut bearing 32. Hub radial guy cables 35 maintain struts 31 in their radial positions.

Wheel-type hub 40 comprises a plurality of struts 41 connected end-to-end to form a segmented circle. Spoke-like cables 42 attach at the connection points of the plurality of struts 41 and terminate at bearings 43 mounted to axle 13, allowing hub 40 to rotate independently of axle 13 and aerostat 10.

Hubs 30, 40 provide mounting points for blades 14 and associated guy cables. Hubs 30 40 serve as compression members during mooring, and as tension members at standard rotational speed, overcoming the radial gravitational forces exerted by blades 14, rotational thrust generating system 15, and winglets 16. Hubs 30, 40, along with the guy cable system, transfer roll and pitch moments to axle 13 and aerostat 10.

Blades 14 are arranged radially and substantially horizontally, outboard of hub 30 or 40. Each blade 14 comprises a spar, a fairing adjacent to winglets 16, and an airfoil extending inboard of fairing to hub 30 or 40. Spars and airfoils extend outboard of winglets 16 in FIGS. 2, 4 and 6. The fairing and rotational thrust generating system 15 permit rotational movements of airfoils. As shown in FIGS. 1 and 2, rotational thrust generating system 15 may be provided at the ends of blades 14 or inboard the end of blade 14, with the airfoils extending inboard and outboard (as shown in FIG. 2) of rotational thrust generating system 15. For purposes of this disclosure, "outboard" is defined as the direction radially extending away from axle 13, whereas "inboard" is defined as the direction radially extending towards axle 13. The blade airfoils may also be configured with a fixed spar extending though all or a portion of the airfoil and rotating in a socket at a mounting point thereof. The airfoils are capable of both positive and negative angles of attack. Lower and upper guy cables 18, 20 hold each blade 14 in a vertical position. Whereas, radial guy cables 17 hold each blade in a radial position. Blades 14 supply lift to the aircraft by controlling their collective angle of attack, and propulsion by controlling their cycling, as defined below. Blades 14 also serve as a mounting point for winglets 16, rotational thrust generating system 15, sling cables 21, and lower and upper guy cables 18, 20.

Rotational thrust generating system 15 comprises a plurality of engines powering thrust generation devices. Each engine may be electric, internal combustion, or turbine. Each thrust generation device may be a propeller or a ducted fan. An engine and thrust generation device of rotational thrust generating system 15 mounts to each blade 14 in such a manner that the thrust line is substantially horizontal and perpendicular to the blade spar. Rotational thrust generating system 15 provides radial thrust to spin rotor assembly 12, and may serve as a mounting point for winglets 16.

Figures 7, 8:
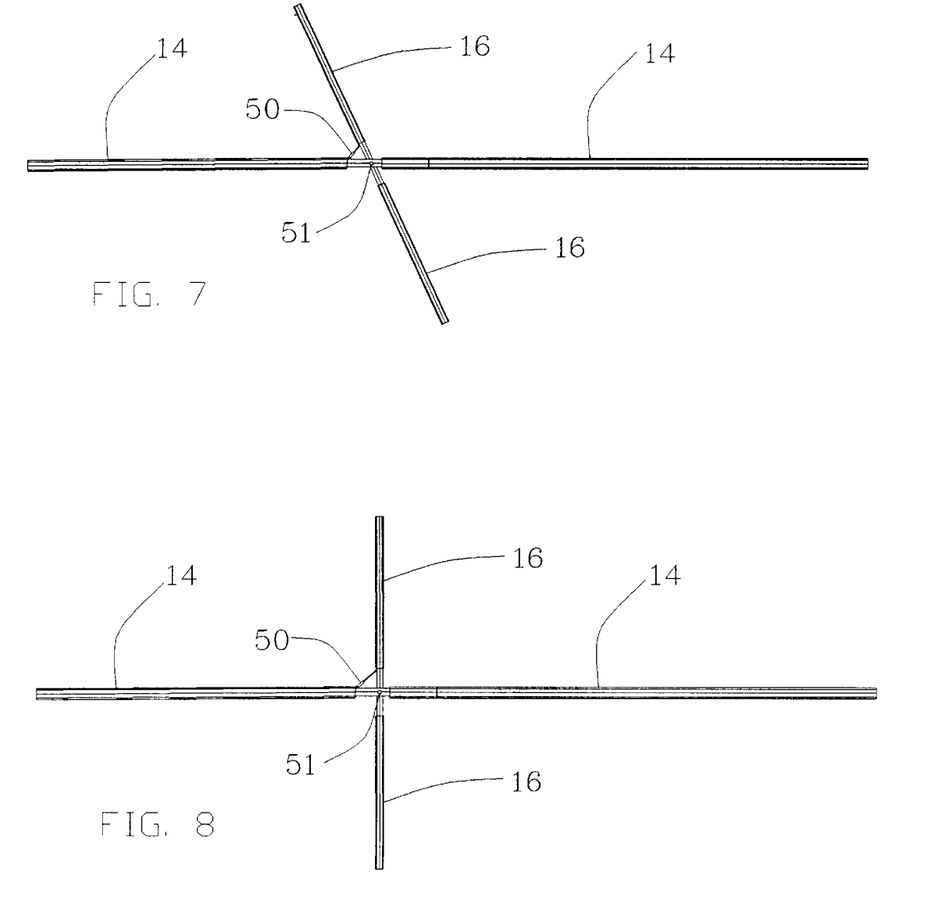
FIG. 7 is a front view of a blade with rotatable winglet rotated away from the aerostat in accordance with the first and second embodiments of the present invention.
FIG. 8 is a front view of a blade with the upper portion of the rotatable winglet rotated towards the aerostat in accordance with the first and second embodiments of the present invention.

Winglets 16 comprise airfoils having adjustable angles of attack and generating thrust on spars mounted at the end or inboard of each blade 14. The winglet spars are preferably mounted above and below blades 14, substantially vertical thereto, and provide forward propulsion. To maintain the thrust created by winglets 16 approximately through the aircraft's average center of drag and momentum, winglets 16 may be mounted at an angle offset from vertical. For more precise and variable control of the winglet thrust, winglets 16 preferably are configured in one of two ways. First, winglets 16 may be rotated about their attachment point bearing 51 by an actuator 50, changing their angular position from vertical to an inboard and outboard direction, as best shown in FIGS. 7 and 8. Second, winglets 16 may be mounted at a dihedral angle, permitting variations in thrust between the upper and lower sections of winglets 16 and creating a thrust vector that passes through the center of drag and momentum of the aircraft. Winglets 16 provide forward propulsion and allow for precise lateral control of the aircraft.

Radial guy cables 17 extend from the outboard area of each blade 14 to the inboard area of an adjacent blade 14 or hub strut 31 or 41. Radial guy cables 17 serve as a diagonal bracing to maintain blades 14 in their radial positions.

Lower guy cables 18 extend from the outboard area of blades 14 to axle 13, via a guy bearing 24 allowing lower guy cables 18 to rotate independently of axle 13 and aerostat 10. Lower guy cables 18 maintain the vertical position of blades 14. Upper guy cables 20 extend from the outboard area of blades 14 to mast 19, via a guy bearing 25 allowing upper guy cables 20 to rotate independently of axle 13 and aerostat 10. Upper guy cables 20 maintain the vertical positions of blades 14 and transfer negative lift from blades 14 to aerostat 10 during buoyant flight.

Sling cables 21 extend from the outboard and inboard areas of blades 14 to lower control cab 23 or directly to the payload. A bearing allows sling cables to rotate independently of lower control cab 23 or the payload. Sling cables 21 transfer the weight of the payload to rotor assembly 12.

Configuration of upper control cab 22 depends upon the use and size of the aircraft. Upper control cab 22 connects with axle 13, via a bearing, contains a control system, and may contain a crew compartment. Upper control cab 22 also comprises an anti-torque system, such as a retro-drive or an anti-torque propeller, for eliminating the friction between guy bearing 24 and the control system interfaces and for enabling cab 22 to be oriented independently of rotor assembly 12 or axle 13.

Configuration of lower control cab 23 also depends upon the use and size of the aircraft. Lower control cab 23 may be in addition to or a replacement for upper control cab 22. Cab 23 contains control systems, may contain a crew compartment, and mounts to sling cables 21, via a bearing. Lower control cab 23 also comprises an anti-torque system, such as a retro-drive or an anti-torque propeller, for eliminating the friction between the lower control cab bearing and control system interfaces and for enabling cab 23 to be oriented independently of rotor assembly 12 or axle 13. Lower control cab 23 may further contain a load management system, such as a winch.

Load cable 26 hangs below the bottom of sling cables 21, transfers lift from the aircraft to the payload, and allows the aircraft to operate at a safe altitude.

Load member 27 may be utilized in either the first or second embodiment of the present invention. As shown in FIGS. 2–4, load member 27 runs from the bottom of axle 13 to the lower end of sling cables 21 and/or lower control cab 23. Load member 27 transfers buoyancy from the aircraft to the payload, permits retraction of lower control cab 23 during landing, and, where load member 27 is a strut, provides stability by acting as a compression member against sling cables 21.

In both the first and second embodiments, the aircraft components are preferably made from the following materials. Aerostat 10 comprises a fabric having a gas barrier or a ridged skin in larger models of the aircraft, as known in the art. Axle 13 comprises tube aluminum. Mast 19 and struts 31, 41 comprise aluminum or composite fiber-resin and are made of tubes, pressurized tubes, or lattice columns depending upon the size of the aircraft. Blades 14 and winglets 16 comprise spars made of aluminum or composite fiber-resin tubes covered by a fairing, and airfoils made of wood, aluminum, composite fiber-resin, or the like. Rotational thrust generating system 15 includes aircraft engines attached to a variable pitch propeller system capable of operating at approximately 1 to 10 times the force of gravity. Guy cables 17, 18, 20, 33, 35, 43 and sling cables 21 are made from stainless steel or fiber cable. Load cable 26 is made from stainless steel, high strength steel, or fiber cable. Load member 27 comprises stainless steel or fiber cable, or, where load member 27 is a strut, the strut is made of aluminum or composite fiber-resin. The control systems comprise mechanical and electronic controls known in the art.

The preferred method of assembling the aircraft comprises the steps of assembling rotor assembly 12, connecting sling cables 21 and cabs 22, 23 to rotor assembly 12, and connecting aerostat 10, mast 19 and upper guy cables 20 to blades 14.

The preferred method of standard mooring (mooring during normal weather conditions) of the aircraft comprises the steps of: attaching load cable 26 to a mooring weight; stopping rotation of the aircraft; bringing the aircraft close to the ground; bringing upper control cab 22 close to the ground by retracting load member 27, when installed, to permit the crew disembark; extending load member 27; attaching a tether line to load cable 26; allowing the aircraft to float upward a safe distance from the ground; and allowing blades 14 and winglets 16 to rotate freely about the spars to minimize aerodynamic drag.

The preferred method of severe weather mooring of the aircraft comprises the standard mooring steps and further includes the steps of: bringing rotor assembly 12 to the ground and tying it down; disconnecting and tethering mast 19 and aerostat 10; and connecting the lower end of the tether line to a mass adequate to anchor the buoyancy of the aircraft.

The preferred method of flying the aircraft comprises the steps of: bringing the aircraft close to the ground to allow the crew to board (although this step may be omitted during unmanned flights); allowing the aircraft to rise a safe distance above the ground for rotation; starting the engines with the propellers in a feathered position; rotating the propellers to generate thrust; generating torque with the thrust to accelerate the rotational speed of rotor assembly 12 and overcome aerodynamic drag; bringing rotor assembly 12 to a radial velocity wherein the engines are at approximately 4 to 10 times the force of gravity, depending upon the size of the aircraft; maintaining the rotational speed of rotor assembly 12 with a governor that adjusts the power output of the engines in accordance with the changes in the aerodynamic drag exerted on the aircraft; applying a negative angle of attack to blades 14 so that the negative lift of blades 14 offsets the buoyancy of the aircraft; and releasing load cable 26 from the ground to permit the aircraft to fly freely. During windy conditions, the method of flying the aircraft further comprises the steps of rotating cabs 22, 23 into the wind; and controlling winglets 16 to create thrust to match the air speed of the aircraft to that of the wind.

Winglets 16 create thrust by cyclically controlling their angle of attack. That is, when the leading edges of the airfoils of winglets 16 move away from aerostat 10, they generate thrust towards aerostat 10. Conversely, when the leading edges of the airfoils of winglets 16 move towards aerostat 10, they generate thrust away from aerostat 10. Winglets 16 perpendicular to the direction of travel of the aircraft have a zero angle of attack. The combination of thrust generated by the different attack angles of winglets 16 enables the aircraft to be propelled through the air. The transition of the angle of attack of winglets 16, as they rotate around aerostat 10, comprises a sinusoidal or modified sinusoidal wave, wherein the quantity of thrust is varied by the amplitude of the wave. The thrust generated by winglets 16 permits not only forward thrust, but also nearly instantaneous vectoring of thrust. This allows precise movement of the aircraft not found in the conventional rotor aircraft which require translation to create forward velocity. Winglets also provide thrust generation when blades 14 are at a zero angle of attack, such as when the aircraft and its payload are at or near neutral buoyancy.

Minor cyclical control of blades 14 may be used to overcome pitch moments created by winglets 16. Cyclical control of blades 14 generates thrust similar to the way a helicopter generates thrust. Cyclical control of blades 14 may augment or replace the thrust created by winglets 16, except when the aircraft is neutrally buoyant, when instantaneous maneuvering is required, or when pendulous stability is used to overcome imbalances in blade lift. Lift and vertical acceleration occur when various angles of attack are equally applied to blades 14.

During forward flight mode, blades 14 have different velocities through the air due to their radial velocity. To maintain level flight, the angle of attack on a blade having a radical velocity in the same direction as the aircraft's travel direction, must be reduced in order to balance the lift with a blade having a radial velocity in the opposite direction. Level flight is the preferred method for carrying passengers. Another flight mode uses pendulous stability in place of some or all of the aerodynamic balancing. Without aerodynamic balancing, a moment is created by the weight imbalance of rotor assembly 12 and the payload being below aerostat 10. Pendulous stability involves rolling the aircraft to an angle where the moment of the differential lift of blades 14 balances with the moment of the pendulum created by rotor assembly 12 and payload swinging below the buoyant aerostat 10. This roll angle creates slippage which must be balanced by the thrust generated by winglets 16 to maintain the direction of travel of the aircraft. Thus, pendulous stability enables maximum lift during forward flight, increasing the maximum payload capable of being carried by the aircraft.

The aircraft is flown by one of the above flight modes to a loading point where it hovers above the payload at a height enabling load cable 26 to be attached to the payload. The angle of attack of blades 14 is increased to generate adequate lift, raising the aircraft and payload to a safe flying altitude. The aircraft and payload are flown to their destination where the aircraft lowers the payload to the ground for disconnection. The aircraft of the present invention is also capable of aerial loading and unloading as required by operations such as dredging, spraying, or fire fighting. During these type of operations, the lift of the aircraft is adjusted to balance the increased or decreased load.

The control system of the aircraft supplies input to the airfoils, rotational thrust generating system 15, and the anti-torque system through mechanical and electronic means known in the art. The control system also controls the radial speed, the angle of attack, and the cyclical control through devices known in the art, and may be linked to auto pilot, inertial navigation, and global navigation systems.

It will be apparent to those skilled in the art that various modifications and variations can be made in the composite aircraft of the present invention and in construction of this aircraft without departing from the scope or spirit of the invention. As an example, the first embodiment of the present invention may comprise rotational thrust generating system 15 mounted inboard, as well as upper and lower winglets 16 arranged at angle offset from the line perpendicular to blades 14.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composite aircraft comprising:
   an aerostat containing a lighter than air gas for lifting the aircraft and a payload attached to the aircraft;
   a rotor assembly mounted below and to the aerostat by an axle, the rotor assembly being statically mounted to the aerostat in all aspects except rotationally about the axle, the rotor assembly including a hub, a plurality of blades, a plurality of winglets, and means for generating rotational thrust, wherein the plurality of blades and winglets have adjustable angles of attack to generate lift and forward propulsion to the aircraft, the plurality of blades are mounted radially from the axle and horizontally from an outboard end of the hub, the plurality of winglets are mounted above and below each blade, and the rotational thrust generating means is mounted outboard of the hub;
   a mast mounted collinearly to the axle and extending through and above the aerostat to allow cables to support the rotor assembly and to transfer negative lift through the cables from the blades to the aerostat;
   a control cab mounted to the hub and providing a control system for the plurality of blades, the plurality of winglets, and the rotational thrust generating means; and
   a plurality of sling cables connecting the plurality of blades to the payload, forming a load sling below the axle.

2. The composite aircraft of claim 1, wherein the hub comprises a plurality of struts mounted radially from the axle, the plurality of struts are maintained in a vertical and radial position by the cables attached to the axle and by each other, and the plurality of struts mount to an inboard end of the blades.

3. The composite aircraft of claim 1, wherein the hub comprises a spoke and wheel assembly having a rim and spoke-like cables running from the axle to the rim, the rim including a plurality of struts connected end to end to form a segmented circle with each spoke-like cable being attached at a connection point of each of the struts for connecting with the plurality of blades.

4. The composite aircraft of claim 1, wherein the plurality of winglets are mounted along the plurality of blades.

5. The composite aircraft of claim 1, wherein the rotational thrust generating means are mounted inboard of the end of the plurality of blades.

6. The composite aircraft of claim 1, wherein the rotational thrust generating means are mounted outboard of the plurality of blades.

7. The composite aircraft of claim 1, wherein the control cab is mounted to one of the load sling or the axle.

8. The composite aircraft of claim 1, wherein a load member extends from the bottom of the axle to the lower ends of the sling cables.

9. The composite aircraft of claim 8, wherein the load member comprises one of a collapsible strut and a cable.

10. The composite aircraft of claim 1, wherein the plurality of blades and winglets rotate 360 degrees around their approximate center of lift to reduce the aerodynamic drag on the aircraft.

11. The composite aircraft of claim 1, wherein the control system allows pendulous stability to create a roll angle for the aircraft, increasing the maximum lift of the aircraft during forward motion.

12. The composite aircraft of claim 1, wherein the plurality of winglets are mounted perpendicular to the center of drag and momentum of the aircraft to maintain the propulsive thrust of the winglets through the center of drag and momentum of the aircraft and to reduce roll in the aircraft.

13. The composite aircraft of claim 12, wherein the plurality of winglets rotate at their attachment point to the blade, maintaining the thrust of the winglets through the center of drag and momentum of the aircraft.

14. The composite aircraft of claim 12, wherein the plurality of winglets are installed at an angle to allow variations in thrust between the upper and lower sections of the winglets, creating a thrust vector that passes through the center of drag and momentum of the aircraft.

15. A method of assembling a composite aircraft comprising an aerostat containing a lighter than air gas for lifting the aircraft and a payload attached to the aircraft, a rotor assembly mounted below and to the aerostat by an axle, a mast mounted collinearly to the axle and extending through and above the aerostat, a control cab mounted to the rotor assembly, and a plurality of sling cables, wherein the rotor assembly is statically mounted to the aerostat in all aspects except rotationally about the axle, the rotor assembly includes a hub, a plurality of blades, a plurality of winglets, and means for generating rotational thrust, the plurality of blades are mounted radially from the axle and horizontally from an outboard end of the hub, the plurality of winglets are mounted above and below each blade, the rotational thrust generating means is mounted to the outboard end of the hub, and the sling cables connect the plurality of blades to the payload, the method comprising the steps of:
   assembling the components of the rotor assembly;
   connecting the sling cables and the control cab to the rotor assembly; and
   connecting the aerostat and the mast to the plurality of blades.

16. A method of mooring a composite aircraft comprising an aerostat containing a lighter than air gas for lifting the aircraft and a payload attached to the aircraft, a rotor assembly mounted below and to the aerostat by an axle, a mast mounted collinearly to the axle and extending through and above the aerostat, a control cab mounted to the rotor assembly, and a plurality of sling cables, wherein the rotor assembly is statically mounted to the aerostat in all aspects except rotationally about the axle, the rotor assembly includes a hub, a plurality of blades, a plurality of winglets, and means for generating rotational thrust, the plurality of blades are mounted radially from the axle and horizontally from an outboard end of the hub, the plurality of winglets are mounted above and below each blade, the rotational thrust generating means is mounted to the outboard end of the hub, and the sling cables connect the plurality of blades to the payload, the method comprising the steps of:

attaching the aircraft to a mooring weight;

stopping rotation of the aircraft;

bringing the aircraft close to the ground;

bringing the control cab close to the ground to permit the crew to disembark;

attaching a tether line to the aircraft;

allowing the aircraft to float upward a safe distance from the ground; and allowing the plurality of blades and winglets to rotate freely to minimize aerodynamic drag.

17. The method of mooring a composite aircraft of claim 16, further comprising the steps of:

bringing the rotor assembly to the ground and tying it down;

disconnecting and tethering the mast and the aerostat; and connecting the lower end of the tether line to a mass adequate to anchor the buoyancy of the aircraft.

18. A method of flying a composite aircraft comprising an aerostat containing a lighter than air gas for lifting the aircraft and a payload attached to the aircraft, a rotor assembly mounted below and to the aerostat by an axle, a mast mounted collinearly to the axle and extending through and above the aerostat, a control cab mounted to the rotor assembly, and a plurality of sling cables, wherein the rotor assembly is statically mounted to the aerostat in all aspects except rotationally about the axle, the rotor assembly includes a hub, a plurality of blades, a plurality of winglets, and means for generating rotational thrust, the plurality of blades are mounted radially from the axle and horizontally from an outboard end of the hub, the plurality of winglets are mounted above and below each blade, the rotational thrust generating means is mounted to the outboard end of the hub, and the sling cables connect the plurality of blades to the payload, the method comprising the steps of:

bringing the aircraft close to the ground to allow the crew to board;

allowing the aircraft to rise a safe distance above the ground for rotation;

generating torque with the rotational thrust generating means to accelerate the rotational speed of the rotor assembly and overcome aerodynamic drag;

bringing the rotor assembly to a radial velocity of approximately 4 to 10 times the force of gravity;

maintaining the radial velocity of the rotor assembly in accordance with the changes in the aerodynamic drag exerted on the aircraft;

applying a negative angle of attack to the plurality of blades so that the negative lift of the plurality of blades offsets the buoyancy of the aircraft; and releasing the aircraft from the ground for free flight.

19. The method of flying a composite aircraft of claim 18, further comprising the steps of:

rotating the control cab into the direction of the wind; and controlling the plurality of winglets to create thrust matching the air speed of the aircraft to that of the wind.

20. A method of flying a composite aircraft using pendulous stability, the composite aircraft comprising an aerostat containing a lighter than air gas for lifting the aircraft and a payload attached to the aircraft, a rotor assembly mounted below and to the aerostat by an axle, a mast mounted collinearly to the axle and extending through and above the aerostat, a control cab mounted to the rotor assembly, and a plurality of sling cables, wherein the rotor assembly is statically mounted to the aerostat in all aspects except rotationally about the axle, the rotor assembly includes a hub, a plurality of blades, a plurality of winglets, and means for generating rotational thrust, the plurality of blades are mounted radially from the axle and horizontally from an outboard end of the hub, the plurality of winglets are mounted above and below each blade, the rotational thrust generating means is mounted to the outboard end of the hub, and the sling cables connect the plurality of blades to the payload, the method comprising the steps of:

rolling the composite aircraft to a roll angle where the moment of the differential lift created by the plurality of blades balances with the moment of the pendulum created by the rotor assembly and payload swinging below the aerostat; and balancing the slippage created by the roll angle and maintaining the direction of travel of the composite aircraft by generating thrust with the plurality of winglets, wherein pendulous stability enables maximum lift during forward flight, and increases the maximum payload capable of being carried by the composite aircraft.

* * * * *